(12) United States Patent
Kim et al.

(10) Patent No.: US 11,637,309 B2
(45) Date of Patent: Apr. 25, 2023

(54) RECHARGEABLE BATTERY, ELECTRODE ASSEMBLY, AND A METHOD FOR MANUFACTURING ELECTRODE ASSEMBLY

(71) Applicant: Samsung SDI Co., Ltd., Yongin-si (KR)

(72) Inventors: Kangwook Kim, Yongin-si (KR); Joonghun Kim, Yongin-si (KR); Backgun Kim, Yongin-si (KR); Wook Su Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1 day.

(21) Appl. No.: 16/335,118

(22) PCT Filed: Jun. 30, 2017

(86) PCT No.: PCT/KR2017/006968
§ 371 (c)(1),
(2) Date: Mar. 20, 2019

(87) PCT Pub. No.: WO2018/056557
PCT Pub. Date: Mar. 29, 2018

(65) Prior Publication Data
US 2019/0214670 A1    Jul. 11, 2019

(30) Foreign Application Priority Data

Sep. 20, 2016   (KR) .......................... 10-2016-0120073

(51) Int. Cl.
*H01M 10/04*     (2006.01)
*H01M 10/0583*   (2010.01)
(Continued)

(52) U.S. Cl.
CPC ....... *H01M 10/0436* (2013.01); *H01M 10/04* (2013.01); *H01M 10/0583* (2013.01);
(Continued)

(58) Field of Classification Search
CPC .... H01M 10/0436; H01M 10/04; H01M 2/16; H01M 10/0583; H01M 2/263;
(Continued)

(56) References Cited

U.S. PATENT DOCUMENTS 9,246,185 B2 * 1/2016 Kretschmar ...... H01M 10/0583
10,312,547 B2 * 6/2019 Zhu .................. H01M 10/0431
(Continued)

FOREIGN PATENT DOCUMENTS

| CN | 101047236 A | 10/2007 |
|---|---|---|
| CN | 102414872 A | 4/2012 |

(Continued)

OTHER PUBLICATIONS

Brewer Science, What is temporary bonding and why is it needed?, Mar. 19, 2015, p. 1-6 (Year: 2015).*
(Continued)

*Primary Examiner* — Christian Roldan
(74) *Attorney, Agent, or Firm* — Lewis Roca Rothgerber Christie LLP

(57) ABSTRACT

An embodiment of the present invention provides an electrode assembly including: a plurality of first electrodes provided with one side edges connected to each other by a first fixing portion; a plurality of second electrodes provided with one side edges connected to each other by a second fixing portion and inserted between the other side edges of the first electrodes; a separator interposed between the first electrode and the second electrode; and lead tabs including (Continued)

a first current collecting tab connected to the first electrode and a second current collecting tab connected to the second electrode.

3 Claims, 13 Drawing Sheets

(51) Int. Cl.
*H01M 50/46* (2021.01)
*H01M 50/409* (2021.01)
*H01M 50/538* (2021.01)
*H01M 50/543* (2021.01)

(52) U.S. Cl.
CPC ......... *H01M 50/409* (2021.01); *H01M 50/46* (2021.01); *H01M 50/538* (2021.01); *H01M 50/543* (2021.01)

(58) Field of Classification Search
CPC ...... H01M 2/30; H01M 2/1673; H01M 2/266; H01M 2/0207; H01M 10/052; H01M 10/0459; Y02E 60/10; Y02P 70/50
USPC .......................................................... 429/94
See application file for complete search history.

(56) References Cited

U.S. PATENT DOCUMENTS

| | | | |
|---|---|---|---|
| 2007/0231698 A1 | 10/2007 | Kawase et al. | |
| 2007/0281214 A1* | 12/2007 | Saruwatari | H01M 4/485 429/231.95 |
| 2009/0165936 A1 | 7/2009 | Sakata et al. | |
| 2010/0227211 A1 | 9/2010 | Chang et al. | |
| 2011/0104567 A1 | 5/2011 | Lee | |
| 2011/0143189 A1* | 6/2011 | Kim | H01M 50/543 429/160 |
| 2013/0189569 A1 | 7/2013 | Youm | |
| 2014/0349192 A1 | 11/2014 | Park et al. | |
| 2015/0072204 A1* | 3/2015 | Kwon | H01M 10/0436 429/94 |
| 2015/0111090 A1 | 4/2015 | Lee et al. | |
| 2015/0180082 A1 | 6/2015 | Jung et al. | |
| 2015/0194639 A1 | 7/2015 | Jeoung et al. | |
| 2016/0087305 A1* | 3/2016 | Yoneda | H01M 4/02 429/127 |

FOREIGN PATENT DOCUMENTS

| | | |
|---|---|---|
| CN | 103236564 A | 8/2013 |
| EP | 2869387 A1 | 5/2015 |
| JP | 2009-140772 | 6/2009 |
| JP | 2013-222602 A | 10/2013 |
| KR | 10-2011-0048839 A | 5/2011 |
| KR | 10-1156344 B1 | 6/2012 |
| KR | 10-2013-0131247 A | 12/2013 |
| KR | 10-2014-0103083 A | 8/2014 |
| KR | 10-2015-0044698 A | 4/2015 |
| KR | 10-2015-0081730 A | 7/2015 |
| KR | 10-1651712 B1 | 8/2016 |

OTHER PUBLICATIONS

EPO Extended Search Report dated Mar. 26, 2020, for corresponding European Patent Application No. 17853271.9 (7 pages).
Korean Office action dated Dec. 16, 2020 issued in corresponding KR Application No. 10-2016-0120073, 5 pages.
Chinese Second Office Action dated Jan. 26, 2022 issued in CN Application No. 201780057584.8, with English translation, 20 pages.
European Patent Office action dated Jan. 26, 2022 issued in EP Application No. 17 853 271.9-1108, 5 pages.
Chinese Office action dated Jul. 1, 2021 issued in corresponding China Application No. 201780057584.8, with English translation, 29 pages.
Chinese Office action issued in corresponding application No. CN 201780057584.8, dated Jul. 25, 2022, with full English translation, 19 pages.

* cited by examiner

RECHARGEABLE BATTERY, ELECTRODE ASSEMBLY, AND A METHOD FOR MANUFACTURING ELECTRODE ASSEMBLY

CROSS-REFERENCE TO RELATED APPLICATION(S)

This application is a National Phase Patent Application of International Patent Application Number PCT/KR2017/006968, filed on Jun. 30, 2017, which claims priority of Korean Patent Application No. 10-2016-0120073, filed Sep. 20, 2016. The entire contents of both of which are incorporated herein by reference.

TECHNICAL FIELD

The present invention relates to a rechargeable battery, an electrode assembly, and a method for manufacturing the electrode assembly, which may have improved durability.

BACKGROUND ART

Generally, a rechargeable battery differs from a primary battery in that it can be repeatedly charged and discharged, while the latter is incapable of being recharged. A low-capacity rechargeable battery is used in a portable electronic device such as a mobile phone, a laptop computer, and a camcorder, and a large-capacity rechargeable battery is widely used as a power source for driving a motor of a hybrid vehicle and the like.

As typical rechargeable batteries, there are a nickel-cadmium (Ni—Cd) battery, a nickel-hydrogen (Ni-MH) battery, a lithium (Li) battery, a lithium ion (Li-ion) rechargeable battery, etc. Particularly, the Li-ion rechargeable battery has an operating voltage that is three times as high as those of the Ni—Cd battery and the Ni-MH battery that are widely used as a power supply of portable electronic devices. In addition, the lithium ion rechargeable battery has been widely used because its energy density per unit weight is high.

In the rechargeable battery, a lithium-based oxide has been used as a positive active material, and a carbon material has been used as a negative active material. Generally, batteries are classified into a liquid electrolyte battery and a polymer electrolyte battery depending on the type of electrolyte, and lithium batteries using a liquid electrolyte are called lithium ion batteries while lithium batteries using a polymer electrolyte are called lithium polymer batteries.

In the rechargeable battery, when the electrode assembly is implemented as a stacked type, processes of stacking multiple positive and negative electrodes are mistakenly performed, staggered, or twisted.

Therefore, in the stacked electrode assembly of the rechargeable battery, the temperature inside the battery may increase due to the mistakenly stacked positions of the positive electrode and the negative electrode, and thus the durability and stability may be deteriorated.

DISCLOSURE

Technical Problem

The present invention has made an effort to provide a rechargeable battery, an electrode assembly, and a method for manufacturing the electrode assembly that may improve durability and stability by preventing the electrode assembly from being twisted.

Technical Solution

An embodiment of the present invention provides an electrode assembly including: a plurality of first electrodes provided with one side edges connected to each other by a first fixing portion; a plurality of second electrodes provided with one side edges connected to each other by a second fixing portion and inserted between the other side edges of the first electrodes; a separator interposed between the first electrode and the second electrode; and lead tabs including a first current collecting tab connected to the first electrode and a second current collecting tab connected to the second electrode.

The plurality of first electrodes may be stacked, and the one side edges of the stacked first electrodes may be connected by the first fixing portion.

The first fixing portion may temporarily bond edge portions of the plurality of first electrodes by welding.

The plurality of second electrodes may be stacked, and the one side edges of the stacked second electrodes may be connected by the second fixing portion.

The second fixing portion may temporarily bond edge portions of the plurality of second electrodes by welding.

The separator may be inserted in a plate shape between the first electrode and the second electrode.

The separator may be formed as a continuous zigzag type, and may be inserted between the first electrode and the second electrode.

Another embodiment of the present invention provides a rechargeable battery, including: a case accommodating an electrode assembly; a cap plate coupled to an opening of the case and provided with a terminal hole; and an electrode terminal provided in the cap plate and including a first electrode terminal connected to the first current collecting tab and a second electrode terminal connected to the second current collecting tab.

A plurality of electrode assemblies may be installed inside the case.

Another embodiment of the present invention provides a method for manufacturing an electrode assembly, including: (a) temporarily bonding edge portions of a plurality of first electrodes with a first fixing portion; (b) temporarily bonding edge portions of a plurality of second electrodes with a second fixing portion; (c) disposing the second electrodes of the step (b) between the first electrodes in the step (a), respectively; and (d) inserting a separator between the first electrode and the second electrode of the step (c).

The first fixing portion of the step (a) may temporarily bond edge portions of the plurality of first electrodes by welding.

The second fixing portion of the step (b) may temporarily bond edge portions of the plurality of second electrodes by welding.

The separator of the step (d) may be inserted as a plate shape between the first electrode and the second electrode.

The separator of the step (d) may be formed as a continuous zigzag type, and may be inserted between the first electrode and the second electrode.

Advantageous Effects

According to the embodiment of the present invention, uncoated regions of a positive electrode and a negative electrode are temporarily bonded, and then stacked to form an electrode assembly. Therefore, it is possible to prevent a temperature increase of a rechargeable battery and to improve durability thereof by preventing the electrode assembly from being twisted.

MODE FOR INVENTION

Figure 1:
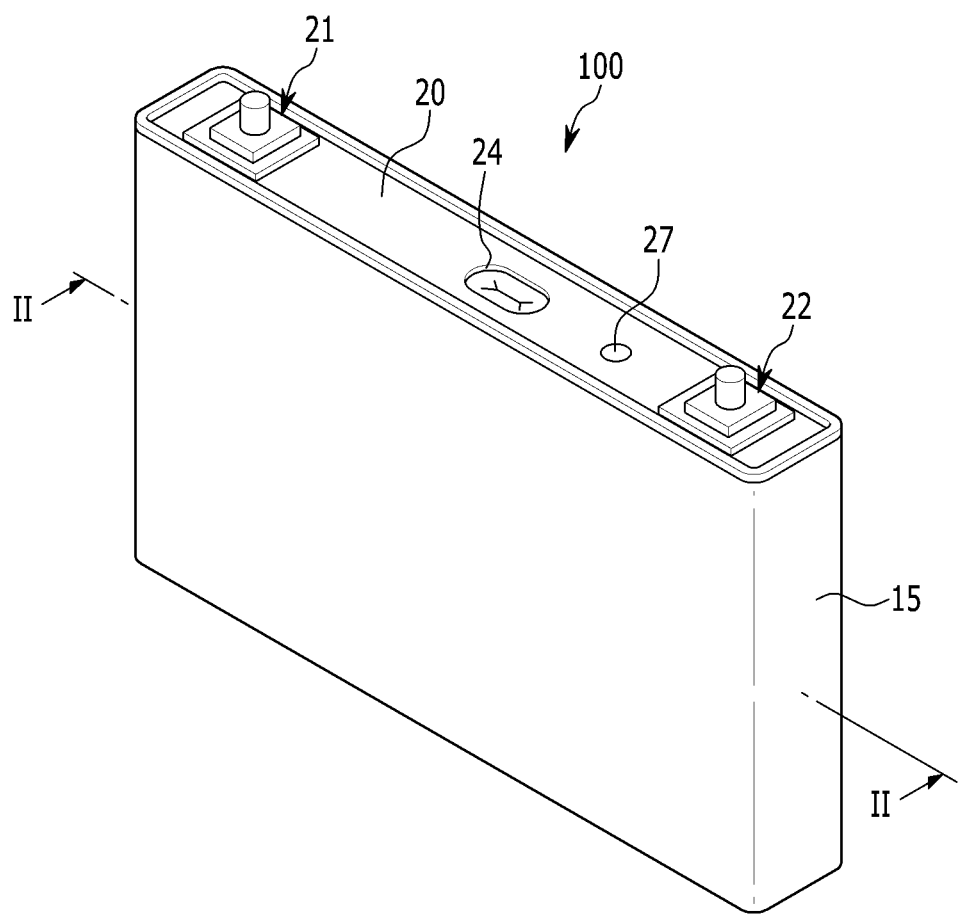
FIG. 1 illustrates a schematic perspective view of a rechargeable battery according to a first embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the scope of the present invention.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "indirectly coupled" to the other element through a third element. In addition, unless explicitly described to the contrary, the word "comprise" and variations such as "comprises" or "comprising" will be understood to imply the inclusion of stated elements but not the exclusion of any other elements.

Figure 2:
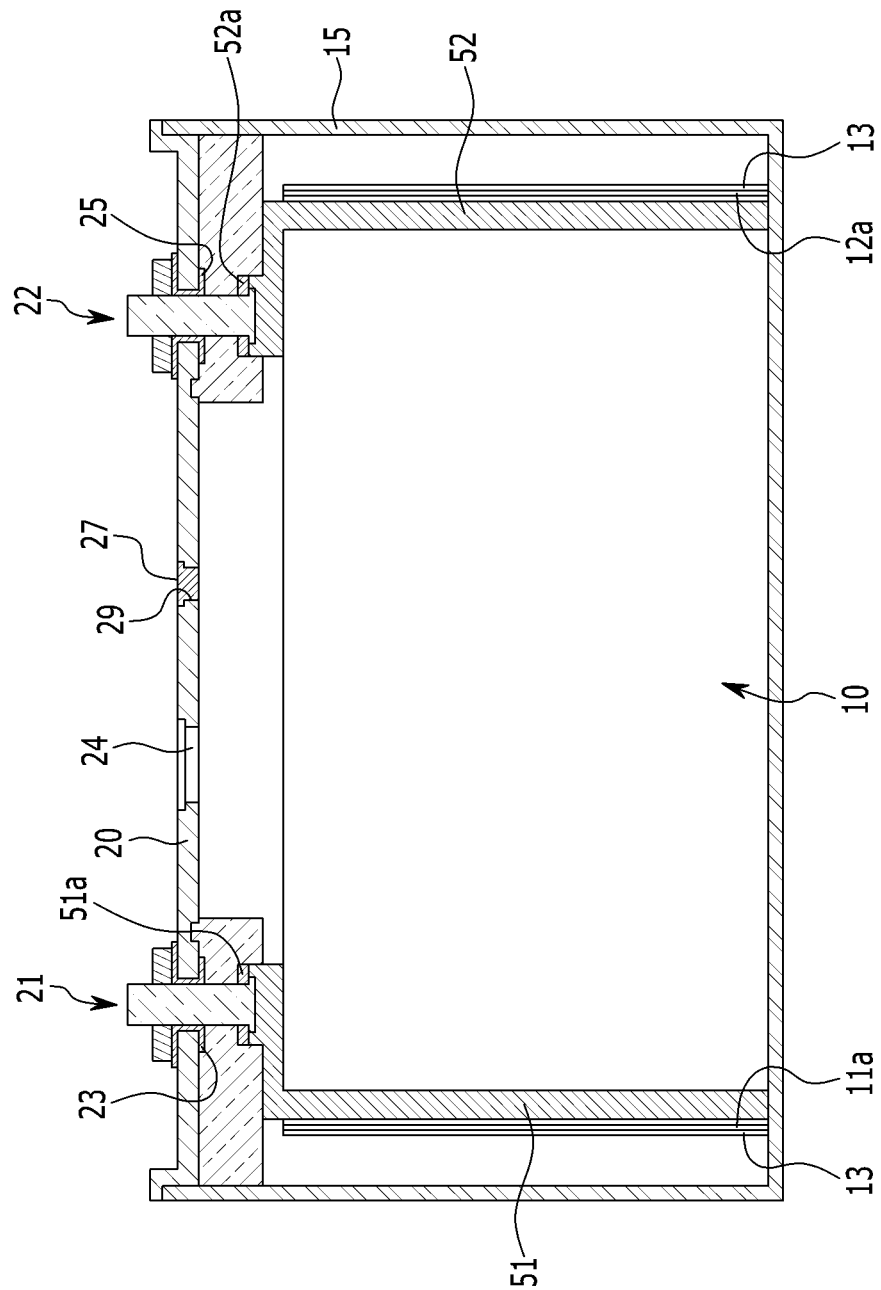
FIG. 2 illustrates a cross-sectional view taken along line ☐-☐ of the rechargeable battery of FIG. 1.
Figure 3:
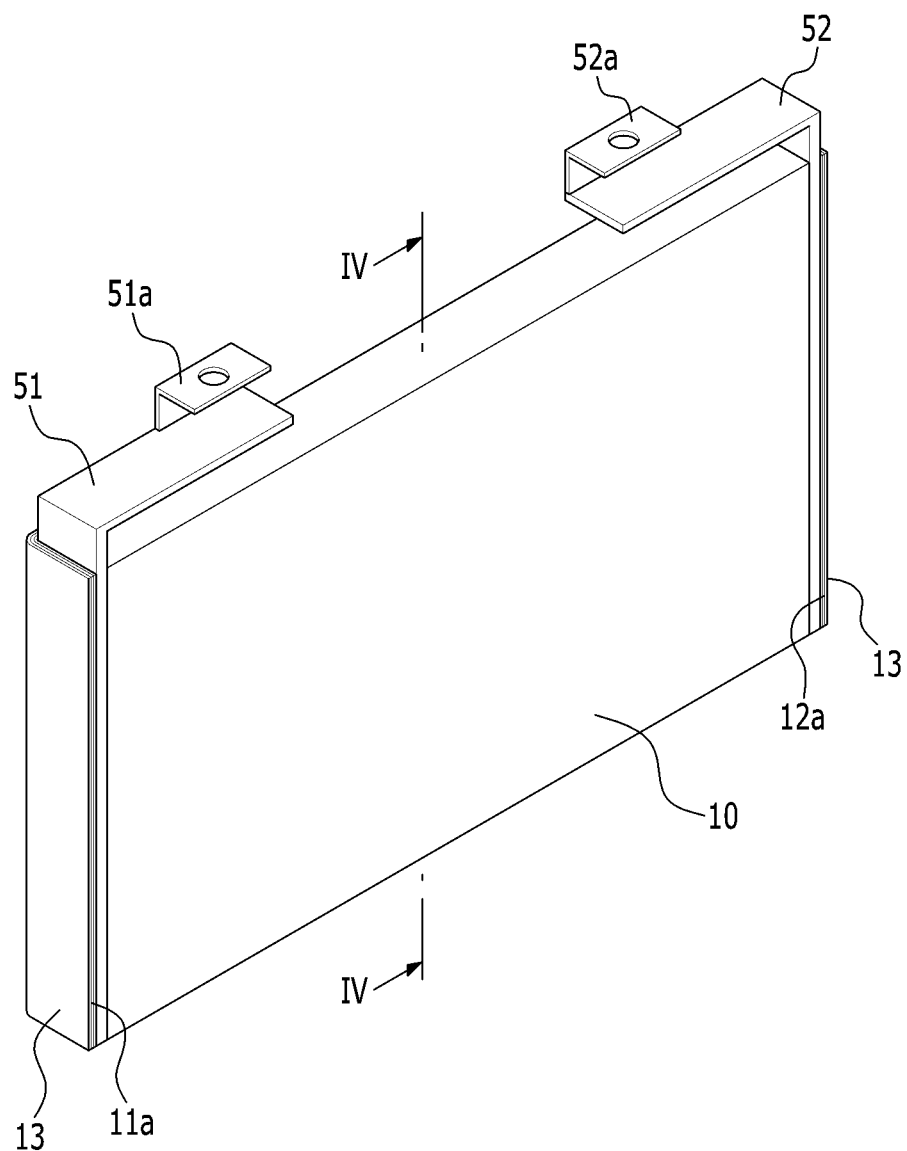
FIG. 3 illustrates a schematic perspective view of an electrode assembly installed inside the rechargeable battery of FIG. 1.
Figure 4:
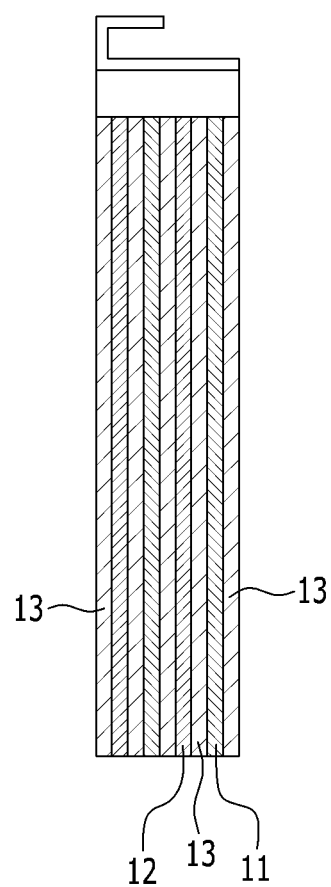
FIG. 4 illustrates a cross-sectional view taken along line IV-IV of FIG. 3.

FIG. 1 illustrates a schematic perspective view of a rechargeable battery according to a first embodiment of the present invention, FIG. 2 illustrates a cross-sectional view taken along line II-II of the rechargeable battery of FIG. 1, FIG. 3 illustrates a schematic perspective view of an electrode assembly installed inside the rechargeable battery of FIG. 1, and FIG. 4 illustrates a cross-sectional view taken along line IV-IV of FIG. 3.

As shown in FIG. 1 to FIG. 4, a rechargeable battery 100 according to a first embodiment of the present invention includes an electrode assembly 10 having a first electrode 11 and a second electrode 12, a case 15 accommodating the electrode assembly 10, a cap plate 20 coupled to an opening of the case 15 and having a terminal hole, electrode terminals 21 and 22 that are provided on the cap plate 20 and that include a first electrode terminal 21 and a second electrode terminal 22, and lead tabs 51 and 52 including a first current collecting tab 51 for connecting the electrode assembly 10 to the first electrode terminal 21 and a second current collecting tab 52 for connecting the electrode assembly 10 to the second electrode terminal 22.

In the electrode assembly 10, the first electrode 11 (hereinafter referred to as a "negative electrode") and the second electrode 12 (hereinafter referred to as a "positive electrode") are disposed on both surfaces of a separator 13 which is an insulator, and the negative electrode 11, the separator 13, and the positive electrode 12 are stacked.

The negative electrode 11 and the positive electrode 12 each include a coated region coated with an active material on a current collector of a metal plate, and uncoated regions 11a and 12a formed of a current collector exposed without coating an active material.

The uncoated region 11a of the negative electrode 11 is formed at one end of the negative electrode 11. The uncoated region 12a of the positive electrode 12 is formed at one end of the positive electrode 12 along the positive electrode 12. Accordingly, the uncoated regions 11a and 12a are disposed at opposite ends of the electrode assembly 10.

For example, the case 15 is formed to have a substantially cuboidal shape so as to set a space for accommodating the electrode assembly 10 and an electrolytic solution therein, and an opening for connecting the outside and the inside space is formed on one surface of the cuboidal shape. The opening allows the electrode assembly 10 to be inserted into the case 15.

The cap plate 20 is installed in the opening of the case 15 to seal the case 15. For example, the case 15 and the cap plate 20 may be formed of aluminum and welded to each other.

In addition, the cap plate 20 is provided with an electrolyte injection port 29, a vent hole 24, and a terminal hole. The electrolyte injection port 29 allows the electrolyte solution to be injected into the case 15 after coupling the cap plate 20 to the case 15. After the electrolyte solution is injected, the electrolyte injection port 29 is sealed with a sealing plug 27. The vent hole 24 is formed to be able to discharge internal pressure of the rechargeable battery 100.

The electrode terminals 21 and 22 are the first electrode terminal 21 and the second electrode terminal 22, and are provided on the cap plate 20 and are electrically connected to the electrode assembly 10. Herein, the first electrode terminal 21 is a negative electrode terminal and the second electrode terminal 22 is a positive electrode terminal.

The negative electrode terminal 21 is electrically connected to the negative electrode 11 of the electrode assembly 10, and the positive electrode terminal 22 is electrically connected to the cap plate 20 by welding or the like, and is connected to the positive electrode through the second current collecting tab 52.

More specifically, the negative electrode terminal 21 passes through the terminal hole, one end thereof may be connected to the first current collecting tab 51, and the other end thereof may protrude to the outside of the cap plate 20.

The positive electrode terminal 22 may pass through the terminal hole, one end thereof may be connected to the second current collecting tab 52, and the other end thereof may protrude to the outside of the cap plate 20.

The electrode assembly 10 may be formed by stacking a plurality of the positive electrodes 12 and a plurality of the negative electrodes 11 in a state in which edge portions thereof are temporarily bonded.

This will be described in detail below with reference to the drawings.

Figure 5:
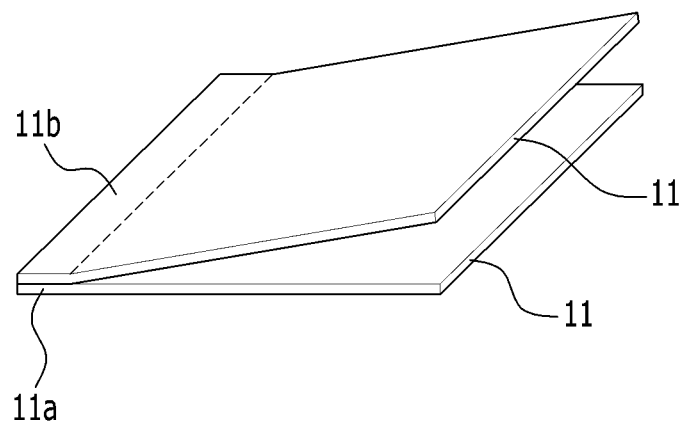
FIG. 5 illustrates a schematic perspective view of a state in which uncoated regions of a plurality of negative electrodes according to a first embodiment of the present invention are temporarily bonded.

FIG. 5 illustrates a schematic perspective view of a state in which uncoated regions of a plurality of negative electrodes according to a first embodiment of the present invention are temporarily bonded.

As shown in FIG. 5, one side edges of the plurality of negative electrodes 11 are temporarily bonded and connected to each other by a first fixing portion 11*b*. Herein, the first fixing portion 11*b* refers to a portion which is temporarily bonded by welding at the uncoated region 11*a* of the negative electrode 11.

That is, in the state in which the plurality of negative electrodes 11 are stacked, the uncoated regions 11*a* of one side edges thereof are temporarily bonded by welding, and the other side edges are not bonded.

The uncoated regions 11*a* are temporarily bonded in the state in which the plurality of negative electrodes 11 are stacked to facilitate a working process in which the positive electrode 12 is inserted and stacked between the negative electrodes 11.

Figure 6:
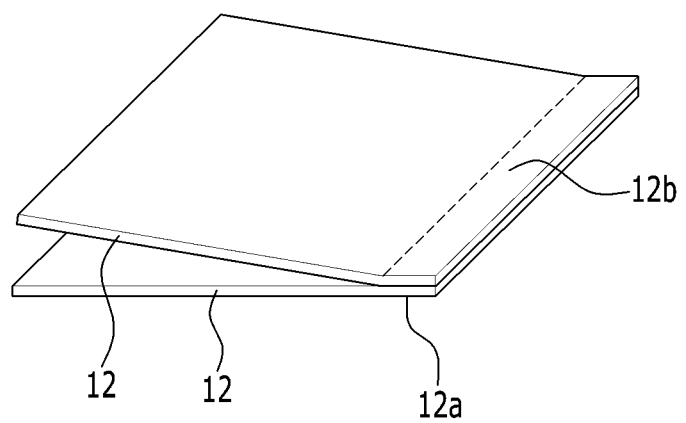
FIG. 6 illustrates a schematic perspective view of a state in which uncoated regions of a plurality of positive electrodes according to a first embodiment of the present invention are temporarily bonded.

FIG. 6 illustrates a schematic perspective view of a state in which uncoated regions of a plurality of positive electrodes according to a first embodiment of the present invention are temporarily bonded.

As shown in FIG. 6, one side edges of the plurality of positive electrodes 12 are temporarily bonded and connected to each other by a second fixing portion 12*b*. Herein, the second fixing portion 12*b* refers to a portion which is temporarily bonded by welding at the uncoated region 12*a* of the positive electrode 12.

That is, in the state in which the plurality of positive electrodes 12 are stacked, the uncoated regions 12*a* of one side edges thereof are temporarily bonded by welding, and the other side edges are not bonded.

Figure 7:
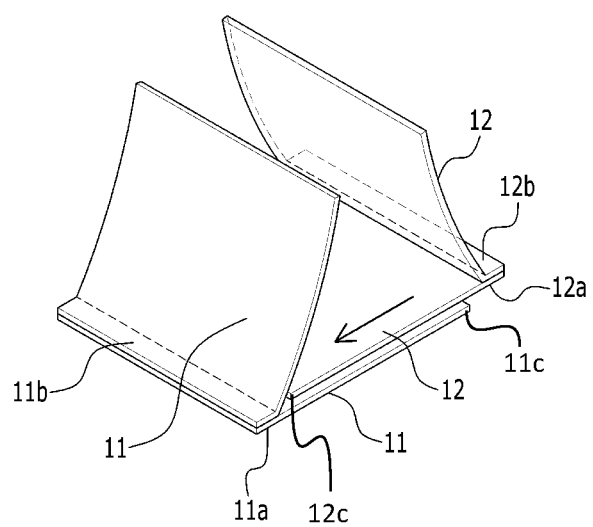
FIG. 7 illustrates a schematic perspective view of a state in which a temporarily bonded positive electrode and a temporarily bonded negative electrode according to a first embodiment of the present invention are staggered from each other.

FIG. 7 illustrates a schematic perspective view of a state in which a temporarily bonded positive electrode and a temporarily bonded negative electrode according to a first embodiment of the present invention are staggered from each other.

As shown in FIG. 7, the respective uncoated regions 11*a* and 12*a* of the negative electrode 11 and the positive electrode 12 are staggered from each other.

That is, non-bonded portions 11*c* and 12*c* of the negative and positive electrodes 11 and 12 are disposed at opposite sides of the temporarily bonded uncoated regions 11*a* and 12*a*, and then are staggered from each other.

The following drawing is a partial perspective view illustrating that a separator is inserted in a state in which a positive electrode and a negative electrode according to a first embodiment of the present invention are staggered.

Figure 8:
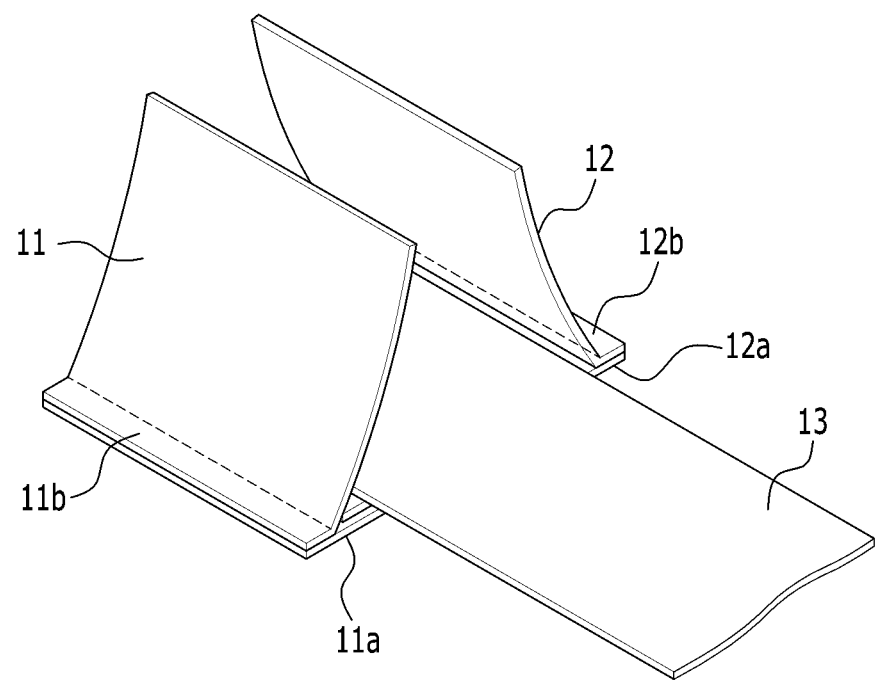
FIG. 8 is a partial perspective view illustrating that a separator is inserted in a state in which a positive electrode and a negative electrode according to a first embodiment of the present invention are staggered.

As shown in FIG. 8, the separator 13 is formed to have a plate-like shape, and may be inserted into a portion in which the positive electrode 12 and the negative electrode 11 are staggered.

As described above, the electrode assembly 10 may be formed by inserting the separator 13 between the positive electrode 12 and the negative electrode 11 in the state in which the portions of the edges of the uncoated regions 11*a* and 12*a* of the positive electrode 12 and the negative electrode 11 are temporarily bonded by welding or the like, and then are staggered from each other.

Accordingly, in a process of stacking the positive electrode 12 and the negative electrode 11 of the electrode assembly 10, the positive electrode 12 and the negative electrode 11 may be stably stacked in a state in which a twist phenomenon is prevented from occurring due to the temporarily bonded state of the first fixing portion 11*b* and the second fixing portion 12*b*. Therefore, it is possible to prevent the internal temperature of a cell from increasing due to a twist of the cell, thereby improving durability of the rechargeable battery.

A negative electrode gasket 23 is provided between inner surfaces of the terminal hole of the cap plate 20 on which the negative electrode terminal 21 is provided to seal and electrically insulate the negative electrode terminal 21 from the cap plate 20.

A positive electrode gasket 25 is provided between inner surfaces of the terminal hole of the cap plate 20 on which the positive electrode terminal 21 is provided to seal and electrically insulate the positive electrode terminal 21 from the cap plate 20.

The lead tabs 51 and 52, which connect the electrode assembly 10 to the electrode terminals 21 and 22, include a first current collecting tab 51 and a second current collecting tab 52. Herein, the first current collecting tab 51 refers to a negative electrode current collecting tab, and the second current collecting tab 52 refers to a positive electrode current collecting tab.

The negative electrode current collecting tab 51 may be formed with a negative electrode bent portion 51*a* connected to the negative electrode terminal 21.

The positive electrode current collecting tab 52 may be formed with a positive electrode bent portion 52*a* connected to the positive electrode terminal 22.

Figure 9:
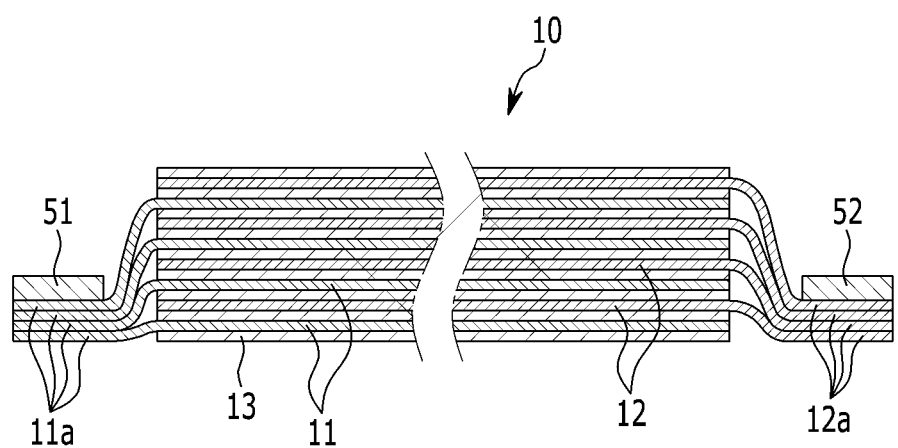
FIG. 9 illustrates a partial cross-sectional view of a state in which a positive electrode current collecting tab and a negative electrode current collecting tab are respectively welded to an uncoated region in a state in which a positive electrode and a negative electrode are stacked according to a first embodiment of the present invention.
Figure 10:
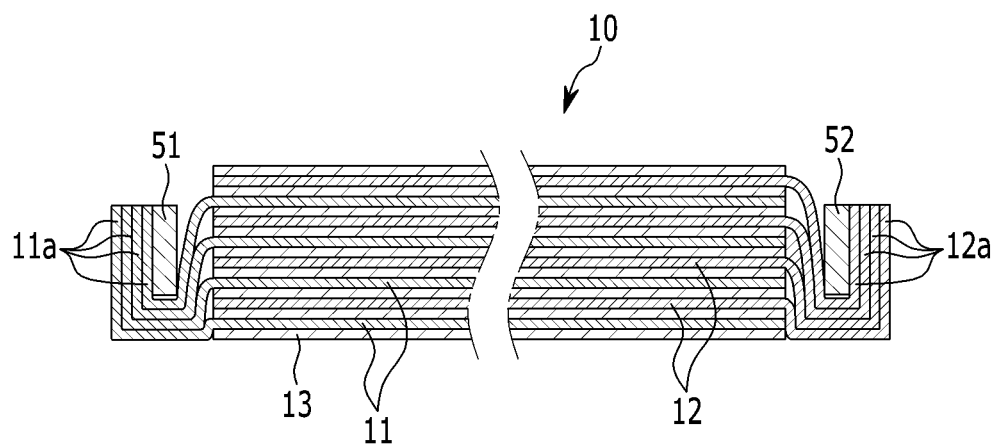
FIG. 10 illustrates a partial cross-sectional view of a state in which a portion in which the positive electrode current collecting tab and the negative electrode current collecting tab of FIG. 9 are connected is bent.

FIG. 9 illustrates a partial cross-sectional view of a state in which a positive electrode current collecting tab and a negative electrode current collecting tab are respectively welded to an uncoated region in a state in which a positive electrode and a negative electrode are stacked according to a first embodiment of the present invention, and FIG. 10 illustrates a partial cross-sectional view of a state in which a portion in which the positive electrode current collecting tab and the negative electrode current collecting tab of FIG. 9 are connected is bent.

First, as shown in FIG. 9, the positive electrode current collecting tab 52 and the negative electrode current collecting tab 51 are welded to the uncoated regions 11*a* and 12*a* protruding from a lateral surface of the electrode assembly 10, respectively.

Then, as shown in FIG. 10, the uncoated regions 11*a* and 12*a* to which the positive electrode current collecting tab 52 and the negative electrode current collecting tab 51 are connected are bent. As described above, the positive electrode current collecting tab 52 and the negative electrode current collecting tab 51 are welded to the electrode assembly 10 and bent, and then may be electrically connected to the electrode terminal.

Figure 11:
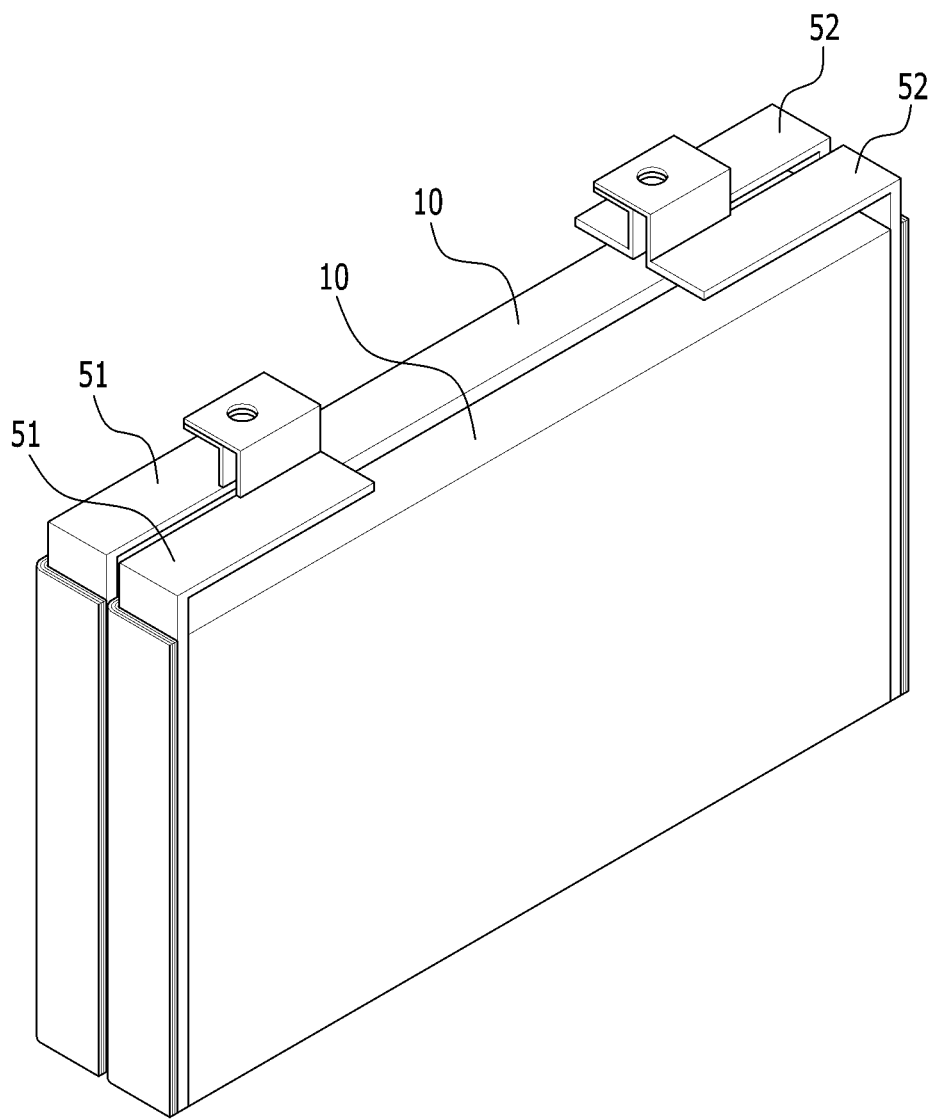
FIG. 11 illustrates a schematic perspective view of an electrode current collector of a rechargeable battery according to a second embodiment of the present invention.

FIG. 11 illustrates a schematic perspective view of an electrode current collector of a rechargeable battery according to a second embodiment of the present invention. The same reference numerals as those in FIGS. 1 to 10 refer to the same or like members having the same or like functions. A detailed description of the same reference numerals will be omitted hereinafter.

As shown in FIG. 11, the current collectors of the electrode assembly 10 of the rechargeable battery 100 according to the second embodiment of the present invention are disposed in two adjacent states, and end portions of the positive electrode current collecting tab 52 and end portions of the negative electrode current collecting tab 51 are electrically connected thereto, respectively.

Therefore, since two electrode assemblies 10 are provided in the case 15, the capacity of the rechargeable battery 100 may be further increased.

Figure 12:
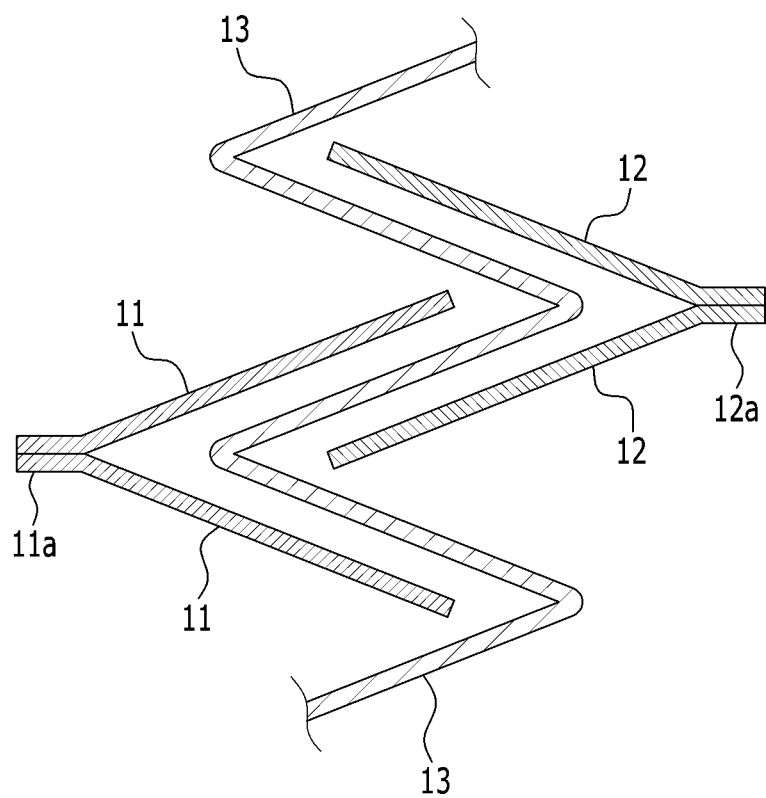
FIG. 12 illustrates a partial cross-sectional view of a state in which a separator of a current collector of a rechargeable battery according to a third embodiment of the present invention, a positive electrode, and an electrode are disposed.

FIG. 12 illustrates a partial cross-sectional view of a state in which a separator of a current collector of a rechargeable battery according to a third embodiment of the present invention, a positive electrode, and an electrode are disposed. The same reference numerals as those in FIGS. 1 to 11 refer to the same or like members having the same or like functions. A detailed description of the same reference numerals will be omitted hereinafter.

As shown in FIG. 12, the separator 13 of the rechargeable battery 100 according to the third embodiment of the present invention is formed in a continuous zigzag shape between the first electrode 11 and the second electrode 12, and is inserted therebetween.

As described above, the separator 13 is formed in the zigzag shape and inserted between the first electrode 11 and the second electrode 12, so that the separator 13 may be more stably inserted into the electrode assembly 10, thereby improving durability.

Figure 13:
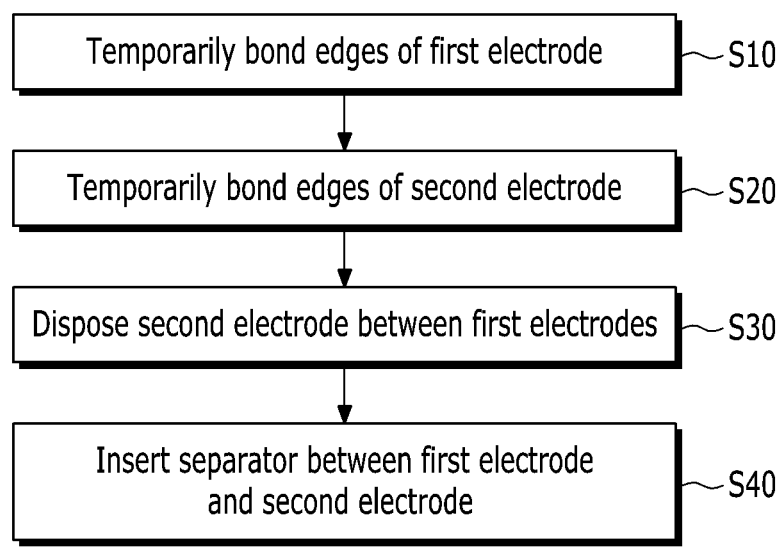
FIG. 13 illustrates a schematic flowchart of a method for manufacturing a rechargeable battery according to an embodiment of the present invention.

FIG. 13 illustrates a schematic flowchart of a method for manufacturing a rechargeable battery according to an embodiment of the present invention. The same reference numerals as those in FIGS. 1 to 12 refer to the same or like members having the same or like functions. A detailed description of the same reference numerals will be omitted hereinafter, and a method for manufacturing the rechargeable battery will be described in detail with reference to the accompanying drawings.

First, the edge portions of the plurality of first electrodes 11 are temporarily bonded by the first fixing portion (S10). Hereinafter, the first electrode 11 refers to a negative electrode and the second electrode 12 refers to a positive electrode. The first electrodes which are the negative electrodes use the same reference numeral 11, and the second electrodes which are the positive electrodes use the same reference numeral 12.

In step S10, the first fixing portion 11*b* refers to a portion which is temporarily bonded by welding at the uncoated region 11*a* of the negative electrode 11. That is, in the state in which the plurality of positive electrodes 12 are stacked, the uncoated regions 11*a* of one side edges thereof are temporarily bonded by welding, and the other side edges are not bonded.

Next, the edge portions of the plurality of the positive electrodes 12 are temporarily bonded by the second fixing portion (S20). At step S20, the second fixing portion 12*b* refers to a portion which is temporarily bonded by welding at the uncoated region 12*a* of the positive electrode 12.

That is, in the state in which the plurality of positive electrodes 12 are stacked, the uncoated regions 12*a* of one side edges thereof are temporarily bonded by welding, and the other side edges are not bonded.

Subsequently, the positive electrode 12 of step S20 is disposed between the negative electrodes 11 of step S10 (S30). That is, at step S30, non-bonded portions of the negative and positive electrodes 11 and 12 are disposed at opposite sides of the temporarily bonded uncoated regions 11*a* and 12*a*, and then are staggered from each other.

Then, the separator 13 is inserted between the negative electrode 11 and the positive electrode 12 of step S30 (S40). Step S40 may be formed by inserting the separator 13 between the positive electrode 12 and the negative electrode 11 in the state in which the portions of the edges of the uncoated regions 11*a* and 12*a* of the positive electrode 12 and the negative electrode 11 are temporarily bonded by welding or the like, and then are staggered from each other.

As described above, since the uncoated regions of the positive electrode 12 and the negative electrode 11 of the electrode assembly 10 are stacked in the state in which they are temporarily bonded by welding, they may be stably stacked in a state in which a twist phenomenon is prevented from occurring. Therefore, it is possible to prevent the internal temperature of a cell from increasing due to a twist of the cell, thereby improving durability of the rechargeable battery.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

DESCRIPTION OF SYMBOLS

| | |
|---|---|
| 10 electrode assembly | 11 first electrode |
| 11a uncoated region | 11b first fixing portion |
| 12 second electrode | 12a uncoated region |
| 12b second fixing portion | 13 separator |
| 20 cap plate | 21 first electrode terminal |
| 22 second electrode terminal | 23 negative electrode gasket |
| 25 positive electrode gasket | 51 first current collecting tab |
| 51a positive electrode bent portion | 52 second current collecting tab |
| 52a positive electrode bent portion | |

The invention claimed is:

1. An electrode assembly comprising:
a plurality of first electrodes provided with first uncoated regions bonded to each other by a first fixing portion and first portions at opposite sides of the first uncoated regions, the first portions being non-bonded portions;
a plurality of second electrodes provided with second uncoated regions bonded to each other by a second fixing portion and second portions at opposite sides of the second uncoated regions, the second portions being non-bonded portions and being inserted between the first portions of the plurality of first electrodes;

a separator interposed between a first electrode of the plurality of first electrodes and a second electrode of the plurality of second electrodes; and lead tabs including a first current collecting tab connected to the first electrode and a second current collecting tab connected to the second electrode, wherein the plurality of first electrodes are stacked, and the first uncoated regions of the stacked plurality of first electrodes are temporarily bonded by the first fixing portion by welding, wherein the plurality of second electrodes are stacked, and the second uncoated regions of the stacked plurality of second electrodes are temporarily bonded by the second fixing portion by welding, wherein the first current collecting tab is welded to one of the first uncoated regions, the first current collecting tab and the one of the first uncoated regions welded to the first current collecting tab being bent toward the first portions and extending along a bending axis of the first current collecting tab and the one of the first uncoated regions, and wherein the second current collecting tab is welded to one of the second uncoated regions, the second current collecting tab and the one of the second uncoated regions welded to the second current collecting tab being bent toward the second portions.

2. The electrode assembly of claim 1, wherein the separator is inserted in a plate shape between the first electrode and the second electrode.

3. The electrode assembly of claim 1, wherein the separator is formed as a continuous zigzag type between the first electrode and the second electrode and inserted between the first electrode and the second electrode.

* * * * *